(12) United States Patent
Hendel et al.

(10) Patent No.: US 6,591,303 B1
(45) Date of Patent: Jul. 8, 2003

(54) METHOD AND APPARATUS FOR PARALLEL TRUNKING OF INTERFACES TO INCREASE TRANSFER BANDWIDTH

(75) Inventors: Ariel Hendel, Cupertino, CA (US); Leo Hejza, Sunnyvale, CA (US); Howard Frazier, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 08/813,647

(22) Filed: Mar. 7, 1997

(51) Int. Cl.[7] .......................................... G06F 15/173
(52) U.S. Cl. ...................... 709/238; 370/401
(58) Field of Search ........................... 370/391, 349, 370/471, 85.4, 255, 463, 17, 218, 353, 389, 515, 346, 397, 232–235; 395/200.02, 431, 500, 881, 200.53; 709/126, 213, 238, 242, 250; 703/26; 710/129; 455/403; 379/10.01; 358/1.14; 340/505

(56) References Cited

U.S. PATENT DOCUMENTS

| 4,703,475 | A | | 10/1987 | Dretzka et al. ............... 370/60 |
|---|---|---|---|---|
| 5,051,926 | A | * | 9/1991 | Stevens et al. ............. 358/1.14 |
| 5,379,296 | A | * | 1/1995 | Johnson et al. ............... 370/60 |
| 5,390,232 | A | * | 2/1995 | Freeman ................... 379/10.01 |
| 5,420,857 | A | * | 5/1995 | Jurkevich .................... 370/397 |
| 5,517,488 | A | | 5/1996 | Miyazaki et al. ............. 370/16 |
| 5,537,394 | A | * | 7/1996 | Abe et al. ..................... 370/17 |
| 5,546,549 | A | * | 8/1996 | Barrett et al. ............... 710/129 |
| 5,550,816 | A | * | 8/1996 | Hardwick et al. .......... 370/397 |
| 5,586,261 | A | * | 12/1996 | Brooks et al. .............. 709/238 |
| 5,619,183 | A | * | 4/1997 | Ziegra et al. ............... 340/505 |
| 5,636,371 | A | * | 6/1997 | Yu ............................... 703/26 |
| 5,689,508 | A | * | 11/1997 | Lyles .......................... 370/391 |
| 5,719,870 | A | * | 2/1998 | Baker et al. ................. 370/463 |
| 5,724,356 | A | * | 3/1998 | Parameswaran Nair et al. .................. 370/401 |
| 5,732,071 | A | * | 3/1998 | Saito et al. .................. 370/255 |
| 5,774,668 | A | * | 6/1998 | Choquier et al. ............ 709/126 |
| 5,781,854 | A | * | 7/1998 | Bales ........................... 455/403 |
| 5,805,586 | A | * | 9/1998 | Perreault et al. ............. 370/346 |
| 5,805,816 | A | * | 9/1998 | Picazo, Jr. et al. ...... 395/200.53 |
| 5,815,505 | A | * | 9/1998 | Mills ........................... 370/522 |
| 5,896,371 | A | * | 4/1999 | Kobayashi et al. .......... 370/232 |
| 5,923,667 | A | * | 7/1999 | Poiraud et al. .............. 370/515 |
| 5,933,412 | A | * | 8/1999 | Choudhury et al. ........ 370/218 |
| 5,951,650 | A | * | 9/1999 | Bell et al. .................... 709/238 |
| 6,049,528 | A | * | 4/2000 | Hendel et al. ............... 370/235 |
| 6,064,671 | A | * | 5/2000 | Killian ........................ 370/389 |
| 6,081,833 | A | * | 6/2000 | Okamoto et al. ........... 709/213 |

FOREIGN PATENT DOCUMENTS

EP  0685952  12/1995  ........... H04L/29/06

OTHER PUBLICATIONS

Browning, Optimal Stochastic Flow Control in a High Speed Virtual Circuit, IEEE 1993.*
Ko et al, Optimal End–to–ENd Sliding Window Flow Control in High–Speed Networks, IEEE 1991.*
Data Communications, vol. 24, No. 13, Sep. 21, 1995, pp. 85–88, 90.
IBM Technical Disclosure Bulletin, vol. 38, No. 9, Sep. 1, 1995, pp. 7–9.

* cited by examiner

Primary Examiner—Mark R. Powell
Assistant Examiner—Thong Vu
(74) Attorney, Agent, or Firm—Blakely, Sokoloff Taylor & Zafman

(57) ABSTRACT

A method and apparatus for interconnecting a first device and a second device in a network. The first device and the second device are connected to a plurality of interfaces. The plurality of interfaces emulate a single high-speed interface. According to an embodiment of the present invention, a first identifier is assigned to the first interface and the second interface at the first device. According to another embodiment of the present invention, one of the plurality of interfaces is selected to transmit a packet of data.

41 Claims, 10 Drawing Sheets

METHOD AND APPARATUS FOR PARALLEL TRUNKING OF INTERFACES TO INCREASE TRANSFER BANDWIDTH

FIELD OF THE INVENTION

The present invention relates to the field of computer networks. More specifically, the present invention relates to a method and apparatus for parallel trunking of interfaces to increase transfer bandwidth between network devices.

BACKGROUND OF THE INVENTION

Local Area Networks (LANs) following the IEEE 802 Standard Architecture are network environments that interconnect end-nodes using various types of network elements. Each of these network elements is subject to its own set of configuration and topology guidelines. These sets of guidelines and rules are intended to deliver a uniform and well defined data link layer behavior over which upper network layers can operate. Examples of this behavior include the emulation of loop-free broadcast domains where any node may communicate with any other node with no prior signaling required, where packet ordering is preserved between any pair of end-nodes, and where every packet is delivered to its destination no more than once.

FIG. 1 illustrates a plurality of end-nodes interconnected by a network. End-nodes 110–113 are typically computers capable of sourcing packets to be delivered over the network 120 to other end-nodes. The end-nodes 110–113 are also capable of sinking packets sent to them by other end-nodes in the network 120. Routers are also considered end-nodes for the purposes of this description. Typical network elements used to build LANs are repeaters (hubs) and bridges. In some cases bridges are designated as LAN switches. The IEEE 802.1d Standard for transparent bridges (LAN switches) and IEEE 802.3 Standard for repeaters and end-nodes provide the topological rules that allow the data link layer behavior described.

Any one of the end-nodes 110–113 may send packets to any other end-node connected to the network 120. Packets are delivered at most once per destination. A sequence of packets sourced at one of the end-nodes 110–113 is seen in the same order at a destination end-node connected to the network 120.

FIG. 2 illustrates a network implementation. The network 200 includes a plurality of repeaters 210 and 211 and switches 220–222. As a rule, links or interfaces connected to repeaters have the same nominal speed or bit rate and links or interfaces connected to switches can have dissimilar speeds or bit rates. An additional property of the switches 220–222 is traffic isolation. Traffic isolation consists of forwarding packets of data only through the links or interfaces where the destination may reside. This property was deliberately defined to increase the overall network capacity. In order to accomplish traffic isolation, switches 220–222 must know which end-nodes 230–236 are reachable via each link or interface. Bridges or switches complying with IEEE 802.1d automatically learn this information with no assistance from the end-nodes 230–236 or any other external agent, and are called transparent bridges.

FIG. 3 illustrates a transparent bridge. Bridge 310 is connected to end-nodes 311–313. A packet from end-node 311 to end-node 312 is not sent to the link where end-node 313 resides because of the property of traffic isolation. The bridge 310 learns the location of the end-nodes 311–313.

Network capacity is central to the function of a network. Traditionally, there have been two approaches to increasing network capacity. The first approach involves partitioning the network. The partitioning approach uses switches, bridges, and routers to replace a network of repeaters. By replacing the network of repeaters with more sophisticated hub devices, the flow of packets in the network is better managed and system performance is increased. The second approach involves providing faster link alternatives. By implementing links that can support higher bandwidth, the network capacity is increased.

Nevertheless, at any given point in time, the choice of link speeds (10, 100, 1000 Mbps) may not match up very well with the amount of sustained throughput that a particular device can support. When switches and high performance routers are used to interconnect multiple links of a given speed, there is a clear need for the inter-switch or inter-router link to be able to support at least some aggregation of the links. If new hardware is required to utilize a newer, higher speed, increased bandwidth network, the utilization of the newer network may not be as attractive from a cost standpoint. Furthermore, the cost associated with implementing a newer network with more sophisticated hubs or faster links may also not be attractive from a cost standpoint.

Thus, what is needed is a method and apparatus for increasing data transfer bandwidth between network devices, such as end-nodes and switches.

SUMMARY

A method for interconnecting a first device and a second device in a network is described. The first device and the second device are connected to a plurality of interfaces. The plurality of interfaces emulate a single high-speed interface.

A method for creating a multiple interface connection is disclosed. A first identifier is assigned to a first interface and a second interface at the first device. A path between the first device to the second device is identified with the first identifier.

A second method for creating a multi-interface connection is disclosed. A first device is connected to a plurality of interfaces. The plurality of interfaces emulate a single high-speed interface.

A network is disclosed. The network includes a first device and a second device. A first interface is coupled to the first device and the second device. A second interface is coupled to the first device and the second device. The first interface and the second interface emulate a single high speed interface. According to an embodiment of the present invention, the first interface and the second interface are assigned an identifier that identifies a path between the first device and the second device.

A network device is disclosed. The network device includes a first port that is connected to a first interface. The network also includes a second port that is connected to a second interface. A trunking pseudo driver is coupled to the first port and the second port. The trunking pseudo driver allows the first interface and second interface to emulate a single high-speed device.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

A method and apparatus for high speed data transfer is disclosed. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Computer System Overview

Figure 1:
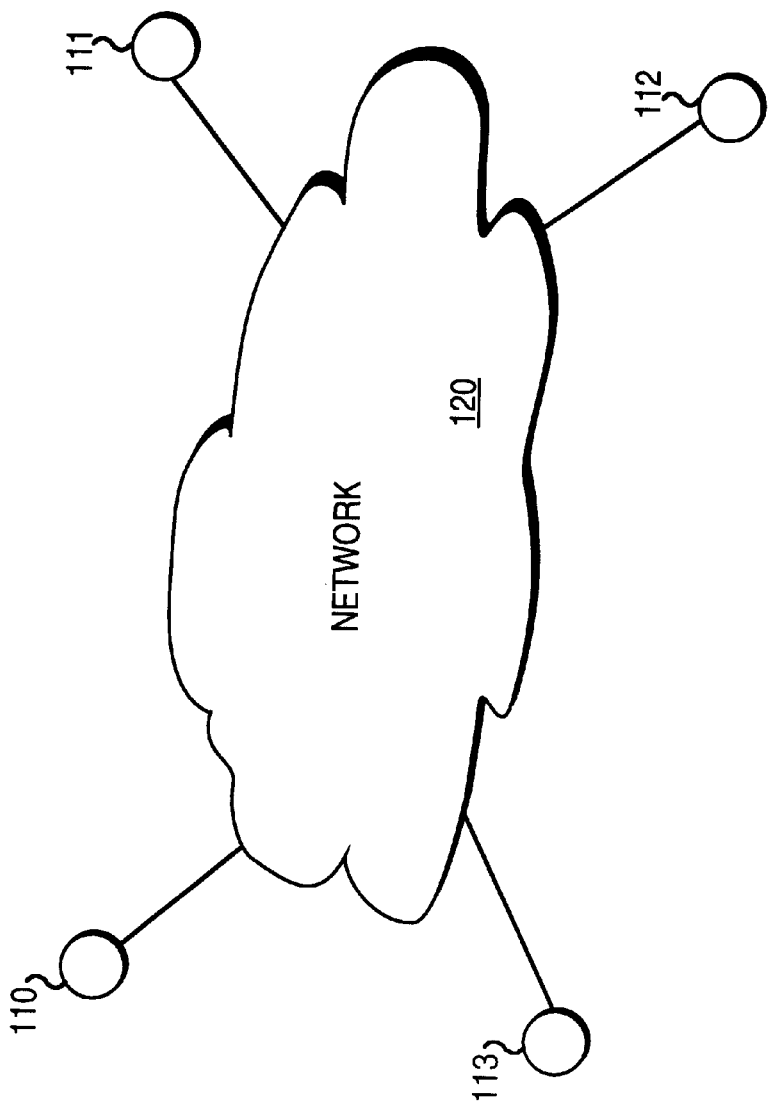
FIG. 1 illustrates a plurality of end-nodes interconnected by a network.
Figure 2:
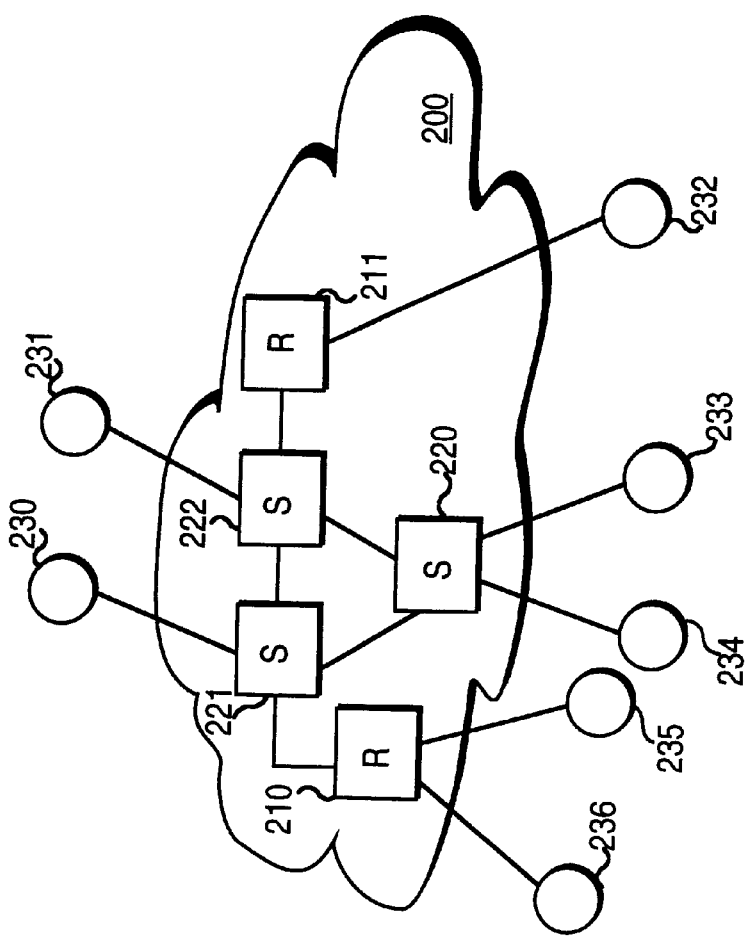
FIG. 2 illustrates a network implementation.
Figure 3:
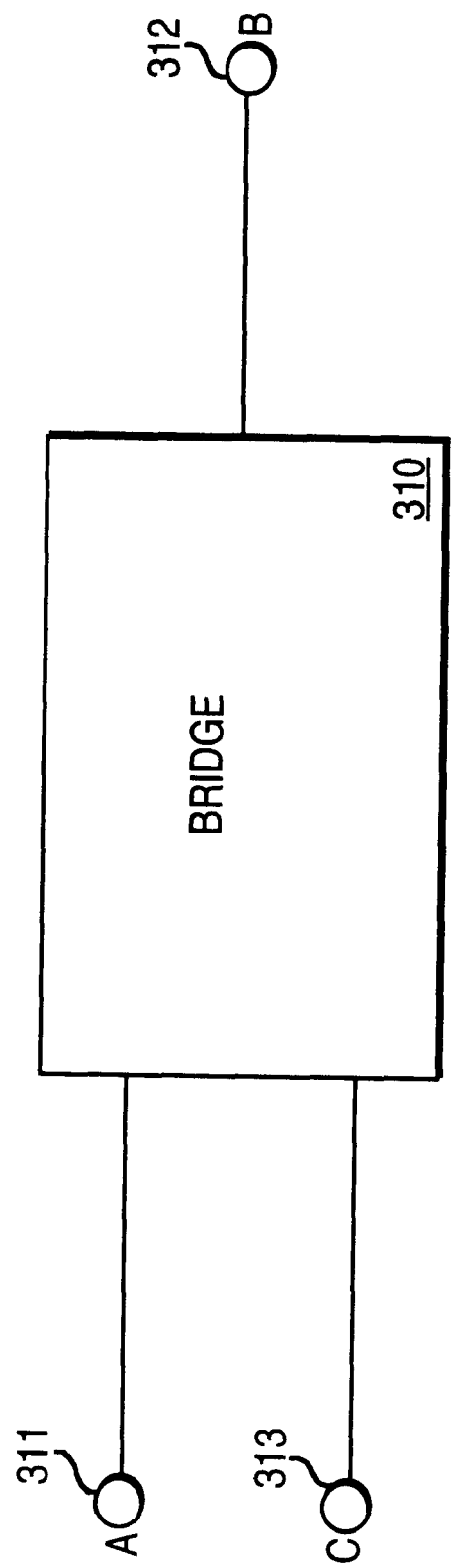
FIG. 3 illustrates a transparent switch.
Figure 4:
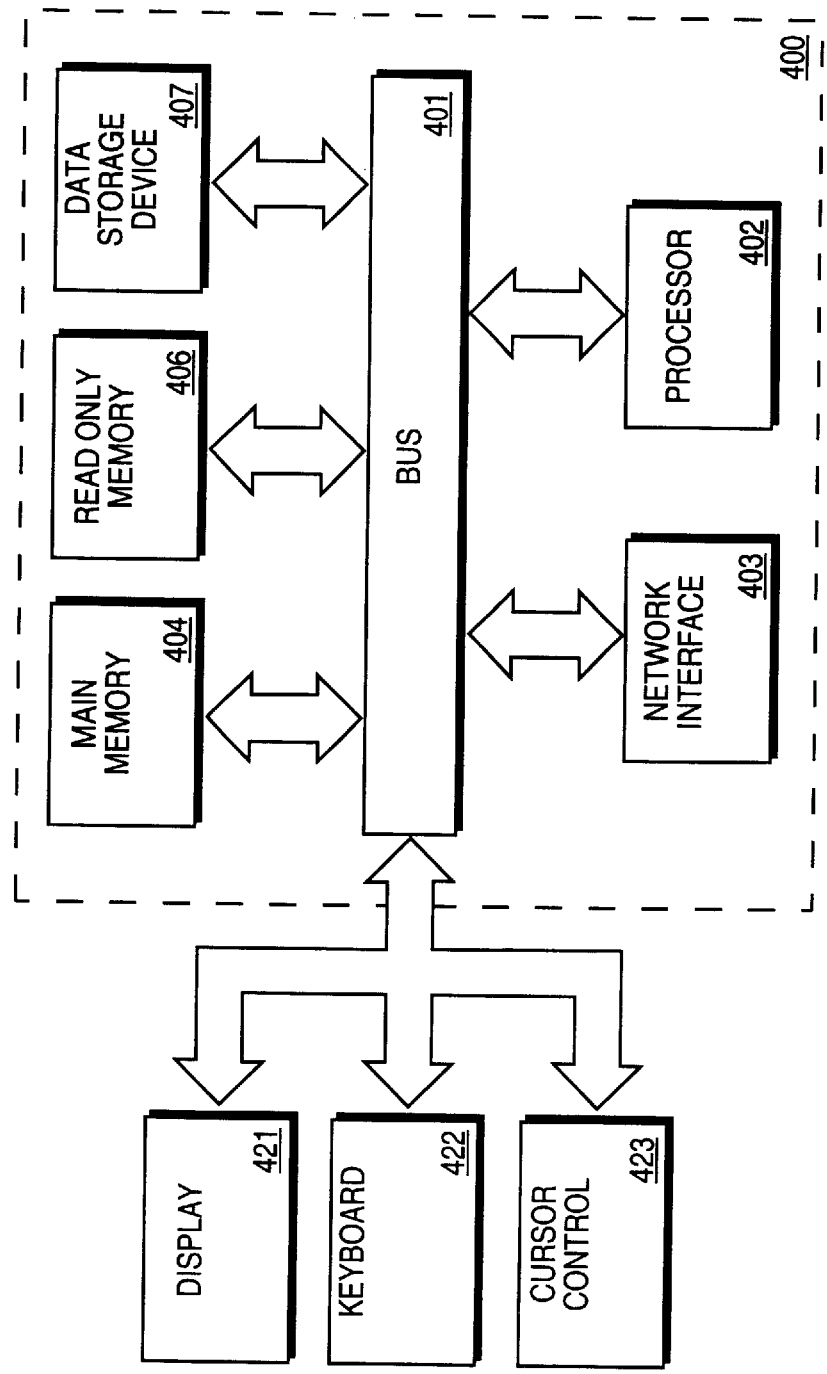
FIG. 4 illustrates a block diagram of a system which may be programmed to implement the present invention.

Referring to FIG. 4, the computer system upon which an embodiment of the present invention can be implemented is shown as 400. Computer system 400 comprises a bus or other communication device 401 that communicates information, and a processor 402 coupled with bus 401 that processes information. System 400 further comprises a random access memory (RAM) or other dynamic storage device 404 (referred to as main memory), coupled to bus 401 that stores information and instructions to be executed by processor 402. Main memory 404 also may be used for storing temporary variables or other intermediate information during execution of instructions by processor 402. Computer system 400 also comprises a read only memory (ROM) and/or other static storage device 406 coupled to bus 401 that stores static information and instructions for processor 402. Data storage device 407 is coupled to bus 401 and stores information and instructions. A data storage device 407 such as a magnetic disk or optical disk and its corresponding disk drive can be coupled to computer system 400. Network interface 403 is coupled to bus 401. Network interface 403 operates to connect computer system 400 to a network (not shown).

Computer system 400 can also be coupled via bus 401 to a display device 421, such as a cathode ray tube (CRT), for displaying information to a computer user. An input device 422, including alphanumeric and other keys, is typically coupled to bus 401 for communicating information and command selections to processor 402. Another type of user input device is cursor control 423, such as a mouse, a trackball, or cursor direction keys for communicating direction information and command selections to processor 402 and for controlling cursor movement on display 421. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 422 wherein all interface is provided via the stylus as a writing instrument (like a pen) and the written text is interpreted using optical character recognition (OCR) techniques.

The present invention is related to the use of computer system 400 to facilitate high speed data transfers via a trunk connection. According to one embodiment, facilitating high speed data transfers via a trunk connection is performed by computer system 400 in response to processor 402 executing sequences of instructions contained in memory 404. Such instructions may be read into memory 404 from another computer-readable medium, such as data storage device 407. Execution of the sequences of instructions contained in memory 404 causes processor 402 to facilitate high speed data transfers via the trunk connection, as will be described hereafter. In alternative embodiments, hard-wired circuitry may be used in place of or in combination with software instructions to implement the present invention. Thus, the present invention is not limited to any specific combination of hardware circuitry and software.

Network Overview

The present invention increases the capacity of individual network links or interfaces that do not have repeaters at either end while preserving the guidelines specified by IEEE 802 as perceived by other end-nodes and network elements in the network. The capacity is increased by connecting an arbitrary number of similar links or interfaces in parallel. This approach is useful whenever increasing the raw speed of the existing link is not technically or economically feasible, or when the physical proximity makes parallel links more appealing than changing the link to faster interfaces and media types.

Figure 5:
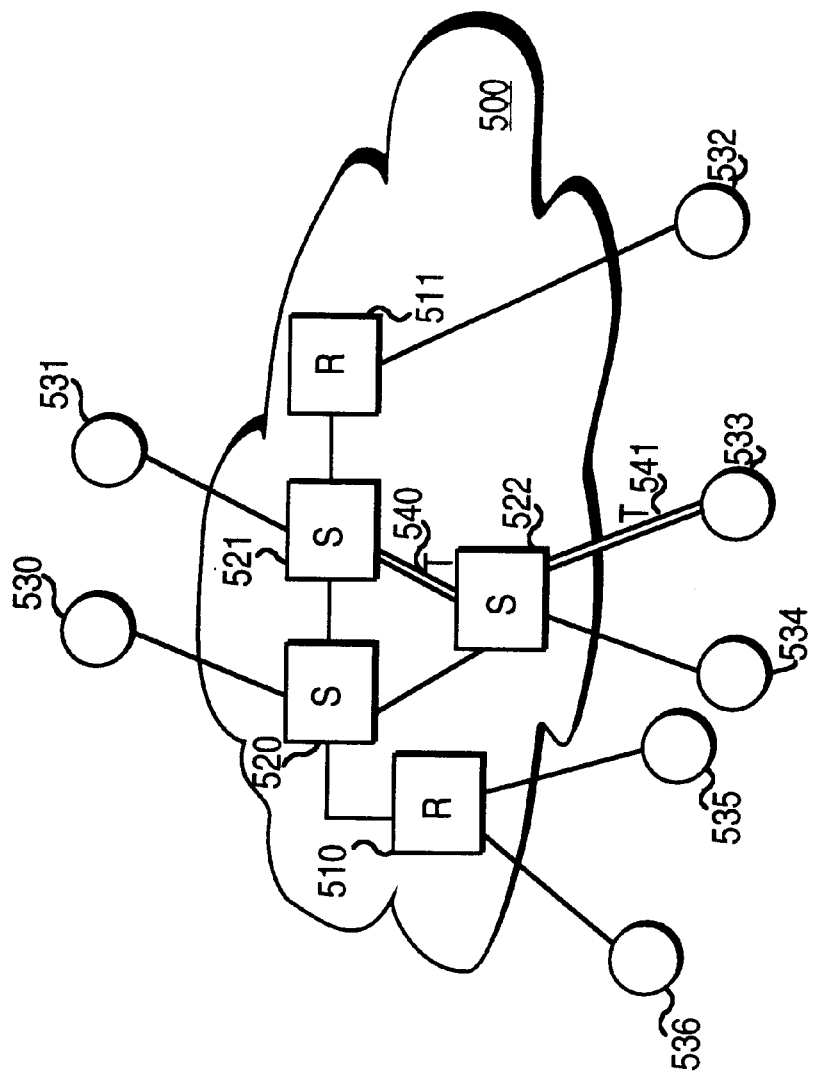
FIG. 5 illustrates a network implementing an embodiment of the present invention.

FIG. 5 illustrates a network according to an embodiment of the present invention. The network 500 includes a plurality of repeaters 510 and 511 and a plurality of switches 520–522. Trunk 540 connects the switch 521 with the switch 522. Trunk 541 connects switch 522 with end-node 533. Trunk 540 and trunk 541 include a plurality of links or interfaces connected in parallel. Connecting a plurality of links or interfaces in parallel increases the capacity in the path between two devices. The present invention implements trunks while preserving the properties of a IEEE 802 network by preserving a behavior that is transparent to and inter-operable with all other end-nodes and network elements that do not participate in the trunk.

Preserving the properties of IEEE 802 requires addressing the following problems:

1) A conventional switch connected to the same media access control (MAC) address over more than one link would only use one of these lines (the one learned last);
2) A trunk is a loop, and loops between switches can be broken by 802.1d;
3) Parallel paths may cause packet re-ordering;
4) A conventional 802.1d switch delivers multiple copies of a packet when an end-node is multi-honed;

5) A conventional 802.1d switch could loop packets back over the other links of a multi-honed end-node.

Each device connected to the trunks 540 and 541 has a trunking layer. The trunking layer is responsible for load balancing to determine which link or interface to use to transmit a given packet of data. Load balancing is applicable to both end-nodes and switches. The layer has additional duties in the cases of switches, including eliminating looped packets, suppressing multiple copies of a packet, and treating the entire trunk connection as a single logical port in its topology database. The trunking layer uses the same MAC address for all the links or interfaces on a trunk to maximize the transparency towards the protocol stack executing in the end-nodes. By using the same MAC address, a single IP address may be associated with the entire trunk.

Figure 6A:
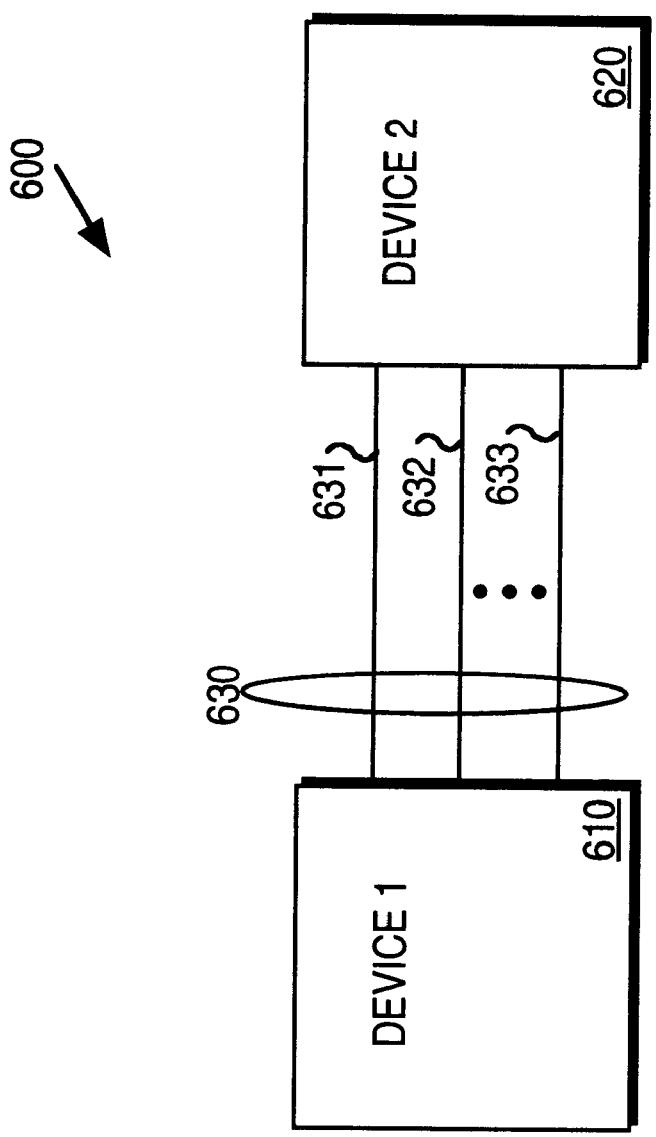
FIG. 6a illustrates a first device and a second device connected to a trunk connection.
Figure 6B:
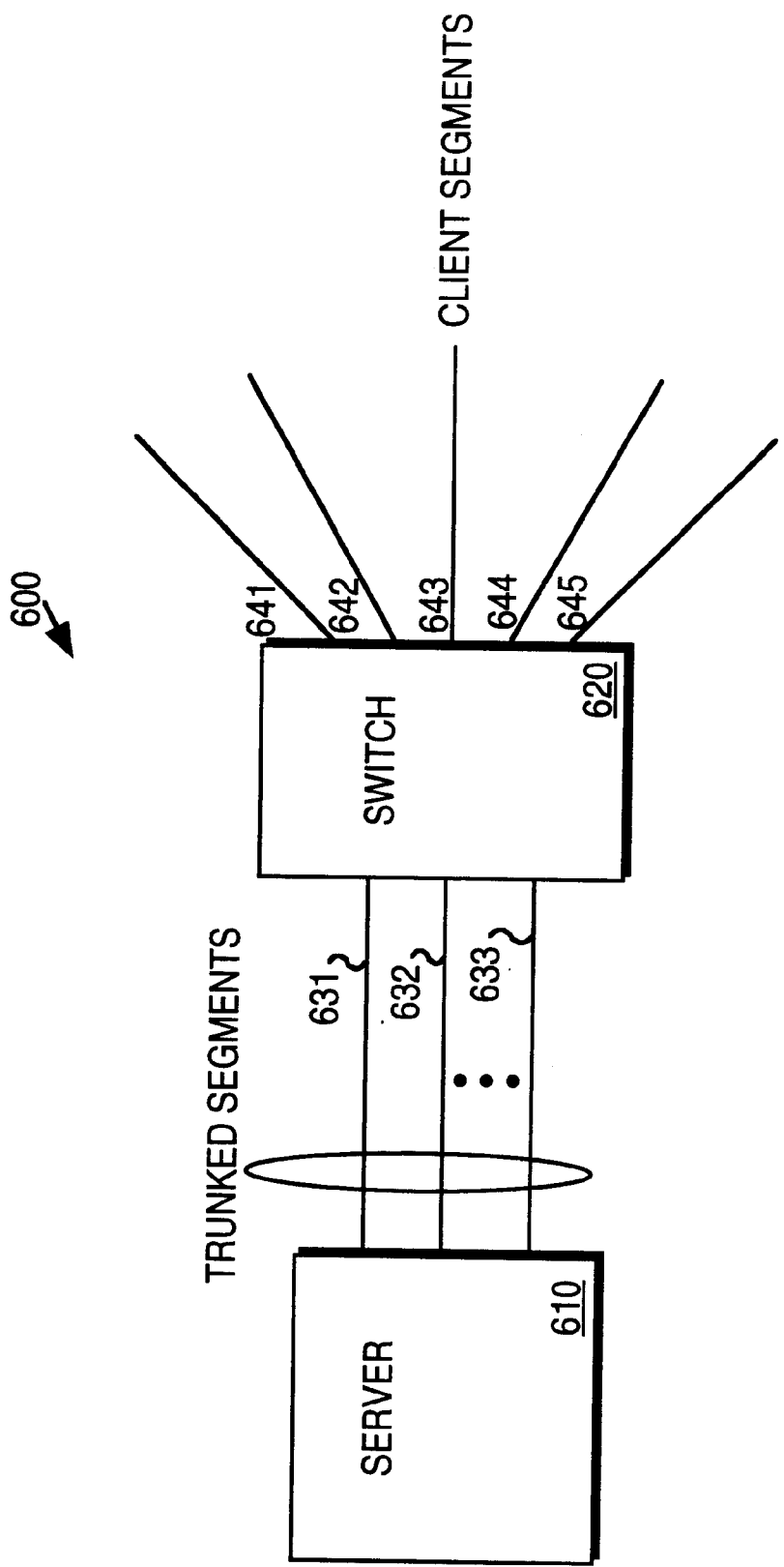
FIG. 6b illustrates the first device and the second device as a server and a switch.
Figure 6C:
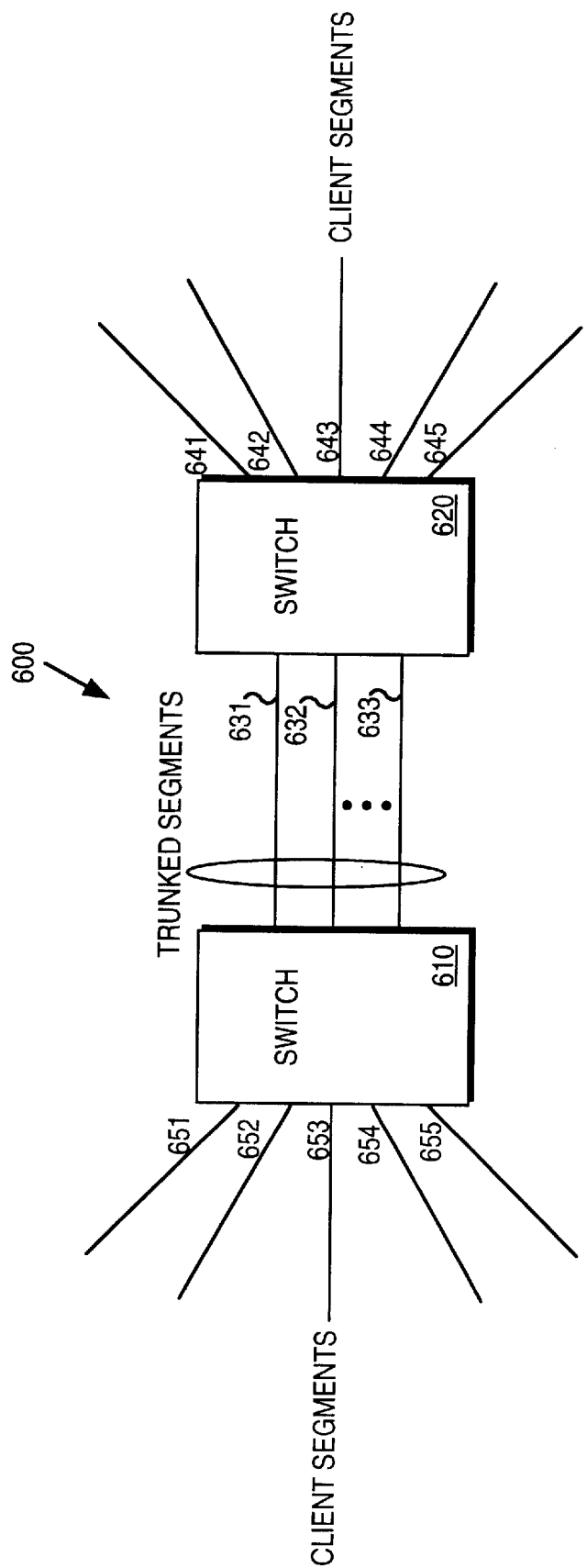
FIG. 6c illustrates the first device and the second device as switches.
Figure 6D:
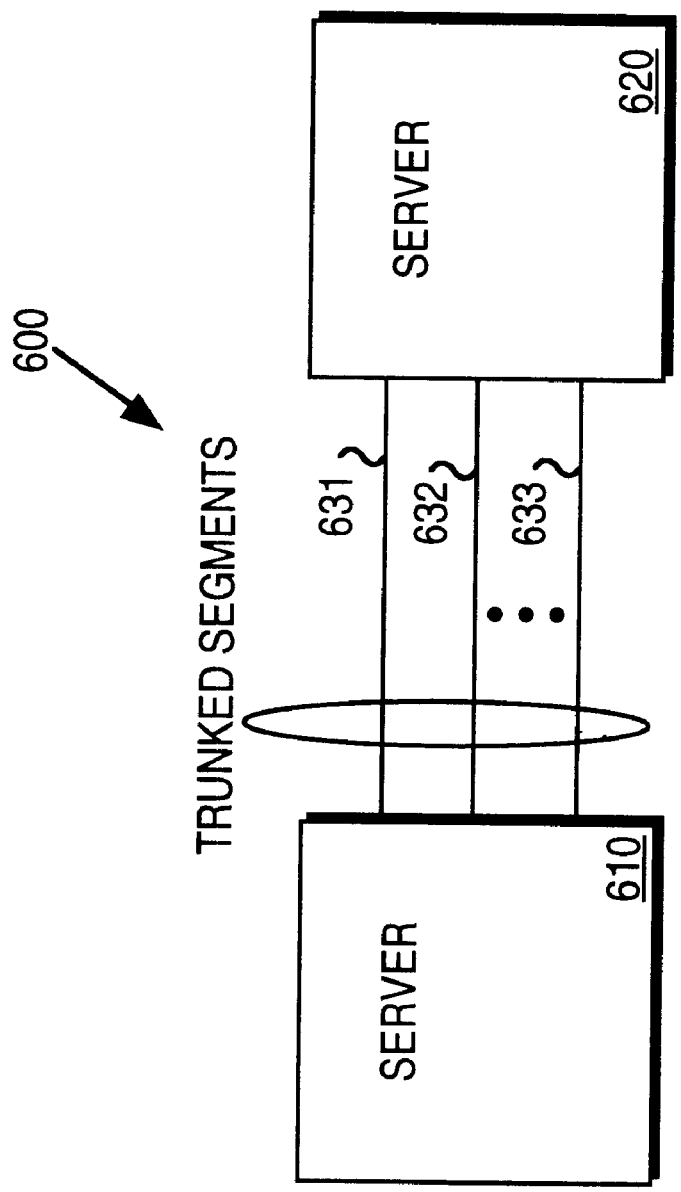
FIG. 6d illustrates the first device and the second device as servers.

FIG. 6a illustrates a first device 610 and a second device 620 connected to a trunk 630 that includes a plurality of links or interfaces 631–633. The first device 610 and the second device 620 may be the switch 521 and the switch 522 connected to the trunk 540 or the switch 522 and the end-node 533 connected to the trunk 541 in FIG. 5. Alternatively, the first device 610 and the second device 620 may be an end-node, such as a server, client, or router, or a switch as illustrated in FIGS. 6b–6d. FIG. 6b illustrates an embodiment of the present invention where the first device 610 is a server and the second device 620 is a switch. Switch 620 is coupled to a plurality of client segments labeled 641–645. The server 610 may be implemented by the computer system 400 illustrated in FIG. 4. FIG. 6c illustrates an embodiment of the present invention where the first and second devices 610 and 620 are switches. The switch 610 is coupled to a plurality of client segments labeled 651–655 and the switch 620 is coupled to a plurality of client segments labeled 641–645. FIG. 6d illustrates an embodiment of the present invention where the first and second devices 610 and 620 are servers.

Figure 7:
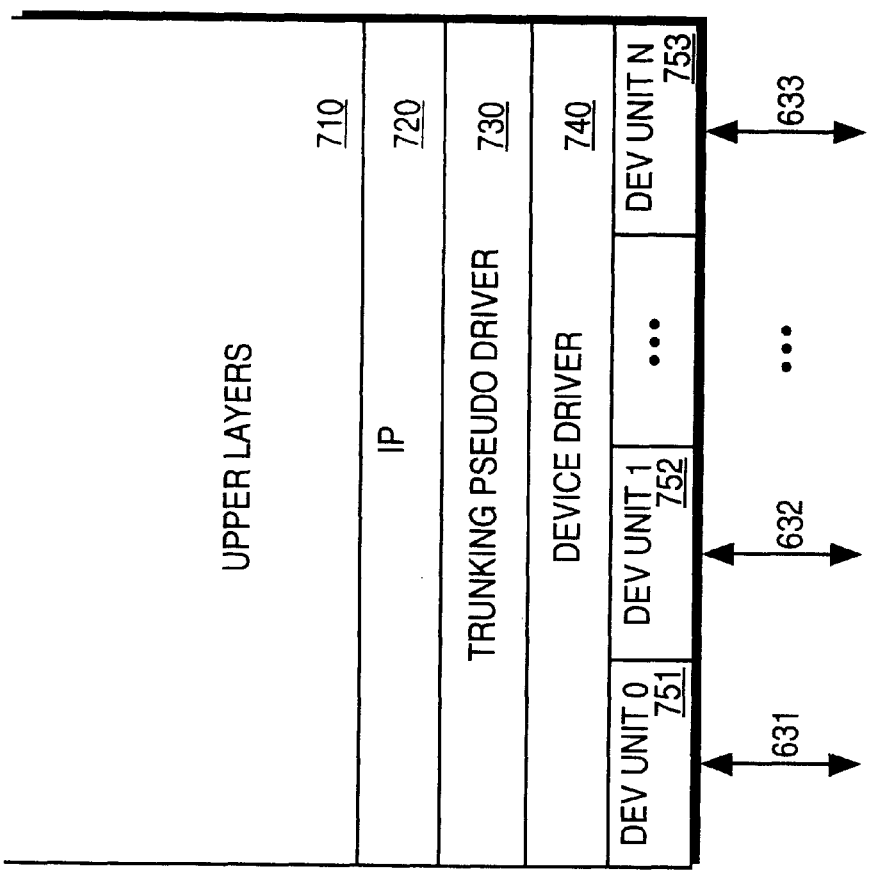
FIG. 7 illustrates a software embodiment of a server interface according to an embodiment of the present invention.

FIG. 7 illustrates a software embodiment of an interface of a computer system connected to a trunk according to an embodiment of the present invention. Upper layers 710 represent any application program that produces or consumes data in the computer system. IP 720 represents an Internet Protocol (IP) layer that makes IP-addressed packets possible. Network device driver 740 represents a layer in the operating system that facilitates communication between hardware and the operating system. Device Units 751–753 represent the physical hardware connected to each of the interfaces 631–633. According to an embodiment of the present invention, interfaces 631–633 are connected to a network device via ports. The trunking pseudo driver 730 resides between the IP layer 720 and the network device driver 740 and contains the trunking layer described above. The trunking pseudo driver 730 splits data in the transmit path and merges data in the receive path of the interfaces 631–633. It should be appreciated that the trunking pseudo driver may be implemented by any known circuitry in a hardware environment.

Trunk Connection Assigned a Identifier

Referring back to FIG. 6a, the plurality of interfaces 631–633 operate to provide a high bandwidth connection between the first device 610 and the second device 620. The physical interfaces 631–633 share a common source device and destination device with each other. The number of interfaces that are implemented may be any number greater than two and dependent on the bandwidth requirement of the network 200; and "trunk" as used herein refers to any such multiple-interface connection, i.e. a connection having at least two links or interfaces. The plurality of interface 631–633 are assigned an associated identifier that identifies the connection between the first device 610 and the second device 620. For end-nodes, the identifier may be a logical name such as a media access control (MAC) address or an Internet Protocol (IP) address. For switches, the identifier may be a grouping identifier with local significance only. End-nodes connected to the trunk 630 will associate all the interfaces 631–633 of the trunk 630 by its identifier. According to an embodiment of the present invention, interfaces 631–633 are Ethernet interfaces, but may be any suitable network interface such as an Intranet interface (such as LAN) or Internet interface. Interfaces 631–633 may be homogeneous, having identical physical layer and media access control layer characteristics, or non-homogeneous. According to a preferred embodiment of the present invention, the physical and media access control layers for each interface are full duplex.

Load Balancing

In order to maximize the throughput rate of data transmitted on the trunk 630, the first device 610 and the second device 620 select one of the interfaces 631–633 in the trunk 630 and uses the selected interface to transmit data. Load balancing in end-nodes typically involves utilizing state information regarding previously sent data, and the status of output queues corresponding to the plurality of interfaces 631–633 in selecting an interface to transmit present data. State information regarding previously sent data is available to the end-node because the software generating the data is running in the same environment as the trunked end-node interface. The depth of the output queue is used as a metric for determining how busy a physical interface is.

The temporal ordering of the packets must be preserved when a stream of packets is to be transmitted from one end-node to one or more end-nodes. In order to satisfy the temporal ordering, the end-node will attempt to ensure that all of the packets associated with a particular transport layer datagram are enqueued on the same network device transmit queue.

According to one embodiment of the present invention, the end-node inspects the header of each packet and uses the information to associate each packet with a particular connection. The end-node keeps a small cache of MAC or IP destination addresses associated with each network interface. When the IP hands the end-node a packet, the end-node checks the cache to see if it has recently transmitted a packet to this destination address. If it has, the end-node will enqueue the packet on the same interface that it enqueued the last packet to this destination address. If the destination address has not been transmitted to recently, the pseudo driver can either enqueue the packet on the last busy transmit queue or the emptiest queue, or the next available queue in a round robin fashion. The end-node updates the cache for that queue with the new destination address. In the situation where the server is sending data to one client, this technique would ensure that all packets to the client travel over the same interface on the trunk.

Load balancing in switches typically involves selecting an interface based on the source address of the packet, or of the packet's port of arrival. The interface selected could, for example, be looked up on a table or calculated using a deterministic algorithm. This scheme results in a static load balancing function that forwards most of the traffic along the same physical interface. As an improvement, it is possible to have a dynamic mapping function and still maintain frame ordering, given that the function changes are slower than the output queue transit times. For instance, the mapping for a given source address can be determined at the time the first packet with the source address is seen, and eventually aged when the source address is not seen for a period of time. By considering both the source address and the port of arrival, the dynamic mapping function reduces the number of pathological cases. For example, if the traffic is spatially dominated by a particular input port, considering the source address helps spread its traffic, and conversely the port of arrival helps distribute traffic dominated by a small number of addresses in particular if more than one trunk connection exists in the switch.

In an alternate embodiment of the present invention, the mapping function separates traffic according to priority or whether the traffic is bandwidth managed. A priority based mapping function is desirable when packet order preservation is not necessary.

Referring back to FIG. 6a, it should be appreciated that the load balancing techniques implemented on device 610 and device 620 do not have to be the same in order to implement the trunk 630. It should also be appreciated that the interfaces 631–633 may be used to transmit data packets bi-directionally.

Loop Prevention

Prevention of frame duplication is achieved at the switch by treating the set of trunked ports on the switch as if they were a single port with a separate queue per physical interface. Forwarding is performed to only one of its queues. Thus, packets of data with broadcast, group, multicast, or unknown unicast address are not replicated or duplicated across the interfaces 631–633 of the trunk 630. Data transmitted through an interface of the trunk 630 are also not sent back through another interface of the trunk 630.

In the foregoing description, the invention is described with reference to specific exemplary embodiments thereof. It will, however, be evident that various modification and changes may be made thereto without departing from the broader spirit and scope of the invention as set forth in the appended claims. The specification and drawings are, accordingly, to be regarded in an illustrative rather than a restrictive sense.

Additional details regarding implementations of the present invention are attached in the Appendix.

What is claimed is:

1. A method for interconnecting a first device and second device in a network, comprising the steps of:
   connecting the first device and the second device to a plurality of interfaces; and
   emulating a single high speed interface with the plurality of interfaces by assigning to said plurality of interfaces an associated identifier that identifies the connection between said first and second devices.

2. The method of claim 1, further comprising the step of selecting one of the plurality of interfaces to send a packet of data.

3. The method of claim 2, wherein the step of selecting one of the plurality of interfaces to send the packet of data comprises utilizing state information in the first device.

4. The method of claim 2, wherein the step of selecting one of the plurality of interfaces to send the packet of data comprises utilizing address information in the packet of data.

5. The method of claim 1, further comprising the step of transmitting a first packet of data on only one of the plurality of interfaces.

6. A method for creating a multi-interface connection that connects a first device and a second device, comprising the steps of:
   assigning a first identifier to a first interface and a second interface at the first device; and
   identifying a path between the first device to the second device with the first identifier.

7. The method of claim 6, wherein the step of assigning the first identifier to the first interface and the second interface comprises assigning a media access control (MAC) address.

8. The method of claim 6, wherein the step of assigning the first identifier to the first interface and the second interface comprises assigning an Internet Protocol (IP) address.

9. The method of claim 6, wherein the step of assigning the first identifier to the first interface and the second interface comprises assigning a grouping identifier.

10. The method of claim 6, further comprising the step of allocating data to be transmitted on the first interface and the second interface such that data traffic on the first interface and the second interface is approximately the same.

11. The method of claim 10, wherein the step of allocating data to be transmitted on the first interface and the second interface, comprises:
    checking an output queue of the first interface and an output queue of the second interface;
    transmitting the data on the first interface when the output queue of the second interface is fuller than the output queue of the first interface and when previous data sent on the first interface is no longer on the first interface; and
    transmitting the data on the second interface when the output queue of the first interface is fuller than the output queue of the second interface and when previous data sent on the second interface is no longer on the second interface.

12. The method of claim 6, further comprising the step of selecting one of the first interface and the second interface to send a packet of data based on address information in the packet of data.

13. The method of claim 6, further comprising transmitting a first packet of data on only one of the first interface and the second interface.

14. A method for creating a multi-interface connection, comprising:
    connecting a first device to a plurality of interfaces;
    emulating a single high-speed interface with the plurality of interfaces.

15. The method of claim 14, further comprising the step of selecting one of the plurality of interfaces to send a packet of data.

16. The method of claim 15, wherein the step of selecting one of the plurality of interfaces to send the packet of data comprises utilizing state information in the first device.

17. The method of claim 15, wherein the step of selecting one of the plurality of interfaces to send the packet of data comprises utilizing address information in the packet of data.

18. The method of claim 14, further comprising the step of transmitting a first packet of data on only one of the plurality of interfaces.

19. A network, comprising:
    a first device;
    a second device;
    a first interface coupled to the first device and the second device;

a second interface coupled to the first device and the second device; wherein the first interface and the second interface emulate a single high speed interface by assigning to said plurality of interfaces an associated identifier that identifies the connection between said first and second devices.

20. The network of claim 19, wherein the first interface and the second interface are homogeneous.

21. The network of claim 19, wherein the first device comprises a load balancing unit that allocates data to be transmitted on the first interface and the second interface such that data traffic on the first interface and the second interface is approximately the same.

22. The network of claim 19, wherein the first device is an end-node.

23. The network of claim 19, wherein the second device is a switch.

24. A network, comprising:

a first device, a second device, a first interface coupled to the first device and the second device;

a second interface coupled to the first device and the second device; wherein the first interface and the second interface are assigned an associated identifier that identifies a path between the first device and the second device.

25. The network of claim 24, wherein the identifier is an Internet Protocol (IP) address.

26. The network of claim 24, wherein the identifier is a media access control (MAC) address.

27. The network of claim 24, wherein the identifier is a grouping identifier.

28. The network of claim 24, wherein the first interface and the second interface are homogeneous.

29. The network of claim 24, wherein the first device comprises a load balancing unit that allocates data to be transmitted on the first interface and the second interface such that data traffic on the first interface and the second interface is approximately the same.

30. The network of claim 24, wherein the first device is an end-node.

31. The network of claim 24, wherein the second device is a switch.

32. A network device, comprising:

a first port that connects to a first interface;

a second port that connects to a second interface;

a trunking pseudo driver, coupled to the first port and the second port, that allows the first interface and second interface to emulate a single high-speed device by assigning to said first and second interfaces an associated identifier that identifies a path between a first device and a second device.

33. The network device of claim 32, wherein the trunking pseudo driver comprises a load balancing unit that selects one of the first and second interfaces to transmit a packet of data.

34. The network device of claim 32, wherein the trunking pseudo driver comprises an identification unit that assigns the associated identifier to the first interface and the second interface.

35. The network device of claim 32, wherein the first and second interface are homogeneous.

36. The network device of claim 32, wherein the network device is an end-node.

37. The network device of claim 32, wherein the network device is a switch.

38. A method for interconnecting a first device and a second device comprising the steps of:

connecting the first device and the second device to a plurality of interfaces, said first and second devices being disposed within a single local area network; and emulating a single high speed interface with the plurality of interfaces.

39. A local area network, comprising:

a first device;

a second device;

a first interface coupled to the first device and the second device;

a second interface coupled to the first device and the second device, wherein the first interface and the second interface emulate a single high speed interface.

40. A local area network, comprising:

a first device;

a second device;

a first interface coupled to the first device and the second device;

a second interface coupled to the first device and the second device, wherein the first interface and the second interface are assigned an identifier that identifies a path between the first device and the second device.

41. A network device, comprising:

a first port that connects to a first interface;

a second port connects to a second interface;

a trunking pseudo driver, coupled to the first port and the second port, that allows the first interface and second interface to emulate a single high speed device for operating in a local area network environment.

* * * * *

(12) EX PARTE REEXAMINATION CERTIFICATE (7063rd)

United States Patent
Hendel et al.

(10) Number: US 6,591,303 C1
(45) Certificate Issued: Sep. 15, 2009

(54) METHOD AND APPARATUS FOR PARALLEL TRUNKING OF INTERFACES TO INCREASE TRANSFER BANDWIDTH

(75) Inventors: Ariel Hendel, Cupertino, CA (US); Leo Hejza, Sunnyvale, CA (US); Howard Frazier, Pleasanton, CA (US)

(73) Assignee: Sun Microsystems, Inc., Mountain View, CA (US)

Reexamination Request:
No. 90/009,174, Jun. 5, 2008

Reexamination Certificate for:
Patent No.: 6,591,303
Issued: Jul. 8, 2003
Appl. No.: 08/813,647
Filed: Mar. 7, 1997

(51) Int. Cl.
*H04L 12/46* (2006.01)
*H04L 25/14* (2006.01)
*H04L 12/56* (2006.01)

(52) U.S. Cl. .................................. 709/238; 370/401
(58) Field of Classification Search .................. None
See application file for complete search history.

(56) References Cited

U.S. PATENT DOCUMENTS

| 4,734,907 A | | 3/1998 | Turner | |
|---|---|---|---|---|
| 5,768,361 A | * | 6/1998 | Cowgill | 379/229 |
| 5,940,598 A | * | 8/1999 | Strauss et al. | 709/249 |

OTHER PUBLICATIONS

Microsoft Press Computer Dictionary. 3rd Edition. 1997. pp. 448–449.*
Park et al. The operation of IP and address resolution over the ATM LANinterworking unit. Oct. 13–16, 1996.*
J. N. Giacopelli et al., "Sunshine: A High–Performance Self–Routing Broadband Packet Switch Architecture," IEEE Journal on Selected Areas in Communications, vol. 9, No. 8, pp. 1289–1298, Oct. 1991 ("Giacopelli").
K. Sklower et al., "The PPP Multilink Protocol (MP)," Network Working Group RFC 1717, Nov. 1994 ("RFC 1717").
Van Landegem et al., "A Self–Healing ATM Network Based on Multilink Principles," IEEE Journal on Selected Areas in Communications, vol. 12, No. 1, pp. 139–148, Jan. 1994 ("Van Landegem").
Malkin et al., "Internet Users' Glossary"Network Working Group, Request for Comment (RFC) 1392, pp. 1–53, Jan. 1993 ("RFC 1392").
IEEE Std. 802–1990, IEEE Standards for Local and Metropolitan Areas Networks: Overview and Architecture, pp. 1–31, Dec. 31, 1990 ("IEEE Std. 802–1990").

* cited by examiner

*Primary Examiner*—Deandra M Hughes

(57) ABSTRACT

A method and apparatus for interconnecting a first device and a second device in a network. The first device and the second device are connected to a plurality of interfaces. The plurality of interfaces emulate a single high-speed interface. According to an embodiment of the present invention, a first identifier is assigned to the first interface and the second interface at the first device. According to another embodiment of the present invention, one of the plurality of interfaces is selected to transmit a packet of data.

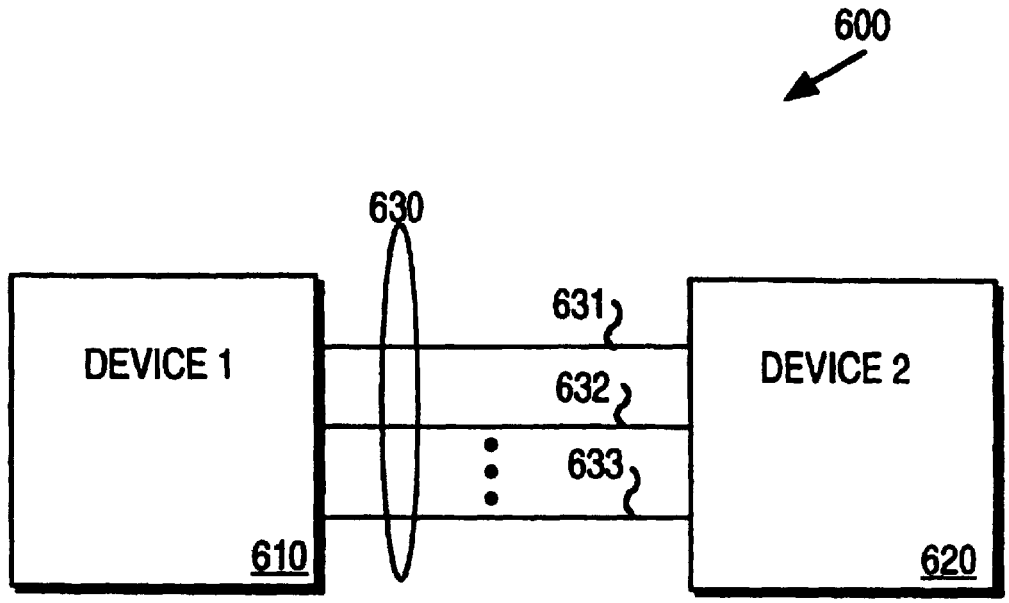

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2–4, 12 and 15–17 are cancelled.

Claims 1, 6, 14, 19, 24, 32 and 38–41 are determined to be patentable as amended.

Claims 5, 7–11, 13, 18, 20–23, 25–31 and 33–37, dependent on an amended claim, are determined to be patentable.

1. A method for interconnecting a first device and second device in a network, comprising the steps of:
   connecting the first device and the second device to a plurality of interfaces; [and]
   emulating a single high speed interface with the plurality of interfaces by assigning to said plurality of interfaces an associated identifier that identifies the connection between said first and second devices; *and*
   *utilizing state information in the first device to select one of the plurality of interfaces to send a packet of data.*

6. A method for creating a multi-interface connection that connects a first device and a second device, comprising the steps of:
   assigning a first identifier to a first interface and a second interface at the first device; and
   identifying a path between the first device to the second device with the first identifier, *by utilizing state information in the first device*.

14. A method for creating a multi-interface connection, comprising:
   connecting a first device to a plurality of interfaces;
   emulating a single high-speed interface with the plurality of interfaces; *and*
   *utilizing state information in the first device to select one of the plurality of interfaces to send a packet of data.*

19. A network, comprising:
   a first device;
   a second device;
   a first interface coupled to the first device and the second device;
   a second interface coupled to the first device and the second device;
   wherein the first interface and the second interface emulate a single high speed interface by assigning to said plurality of interfaces an associated identifier that identifies the connection between said first and second devices; *and*
   *selecting said first interface or said second interface for communication between said first device and said second device by utilizing state information in the first device.*

24. A network, comprising:
   a first device[,];
   a second device[,];
   a first interface coupled to the first device and the second device;
   a second interface coupled to the first device and the second device;
   wherein the first interface and the second interface are assigned an associated identifier that identifies a path between the first device and the second device; *and*
   *wherein one of said first interface or said second interface is selected based upon state information in the first device.*

32. A network device, comprising:
   a first port that connects to a first interface;
   a second port that connects to a second interface;
   a trunking pseudo driver, coupled to the first port and the second port, that allows the first interface and second interface to emulate a single high-speed device by assigning to said first and second interfaces an associated identifier that identifies a path between [a first] *the* device and [a second] *another* device, *wherein said path is selected by utilizing state information in the device*.

38. A method for interconnecting a first device and a second device comprising the steps of:
   connecting the first device and the second device to a plurality of interfaces, said first and second devices being disposed within a single local area network; [and]
   emulating a single high speed interface with the plurality of interfaces; *and*
   *selecting one of the plurality of interfaces to communicate between said first device and said second device by utilizing state information in said first device.*

39. A local area network, comprising:
   a first device;
   a second device;
   a first interface coupled to the first device and the second device;
   a second interface coupled to the first device and the second device[,]; *and*
   wherein the first interface and the second interface emulate a single high speed interface, *and wherein one of said first interface or said second interface is selected for communication between the first device and the second device by utilizing the state information from the first device.*

40. A local area network, comprising:
   a first device;
   a second device;
   a first interface coupled to the first device and the second device;
   a second interface coupled to the first device and the second device[,]; *and*
   wherein the first interface and the second interface are assigned an identifier that identifies a path between the first device and the second device; *by utilizing the state information from the first device.*

41. A network device, comprising:
a first port that connects to a first interface;
a second port connects to a second interface; *and*
a trunking pseudo driver, coupled to the first port and the second port, that allows the first interface and second interface to emulate a single high speed device for operating in a local area network environment, *and for selecting one of said first interface and said second interface by utilizing the state information of the first device.*

* * * * *